United States Patent [19]
Matsuzaki

[11] 3,731,601
[45] May 8, 1973

[54] FLASH SYNCHRONIZING DEVICE

[75] Inventor: Soichiro Matsuzaki, Tokyo, Japan

[73] Assignee: Olympus Optical Co., Ltd., Tokyo, Japan

[22] Filed: Apr. 21, 1971

[21] Appl. No.: 135,927

[52] U.S. Cl.................95/10 CE, 95/11.5 R, 95/64 A
[51] Int. Cl................................................G03b 7/16
[58] Field of Search.............95/10 C, 10 CE, 10 CT, 95/10 CD, 64 A, 11.5 R

[56] References Cited

UNITED STATES PATENTS

| | | | |
|---|---|---|---|
| 3,392,643 | 7/1968 | Rentschler | 95/64 A |
| 3,422,738 | 1/1969 | Mori et al. | 95/10 CT |
| 3,504,602 | 4/1970 | Kiper et al. | 95/11.5 R |
| 3,368,468 | 2/1968 | Rentschler | 95/64 A |

*Primary Examiner*—Samuel S. Matthews
*Assistant Examiner*—Russell E. Adams, Jr.
*Attorney*—Kelman & Berman

[57] ABSTRACT

Flash synchronizing device of a photographic camera having an automatic exposure control device and a programming shutter for synchronizing a flash bulb used with the camera so as to obtain the proper exposure. The device comprises M-contacts coupled with the shutter so as to be closed at about the moment the shutter blades begin to be opened, and a variable resistor connected to the automatic exposure control device of the camera and coupled with a distance setting ring of the camera so that the resistance of the variable resistor is varied as the distance set in the distance setting ring is varied. The resistance characteristics of the variable resistor is so determined that the aperture of the programming shutter is increased by the resistance of the variable resistor beyond the aperture normally obtainable by the automatic exposure control device thereby permitting the decrease in the light quantity received through the shutter due to the non-synchronization of the peak of radiation of the flash bulb with the full aperture of the shutter controlled by the automatic exposure control device to be compensated for to attain the proper exposure.

4 Claims, 26 Drawing Figures

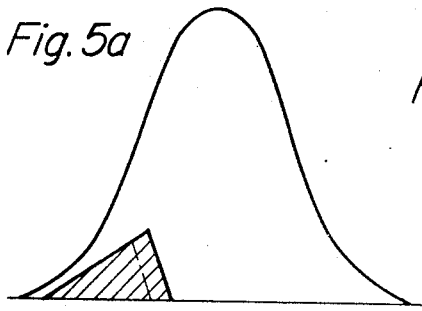 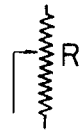  
Fig.5a  Fig.5b  Fig.5c  Fig.5d
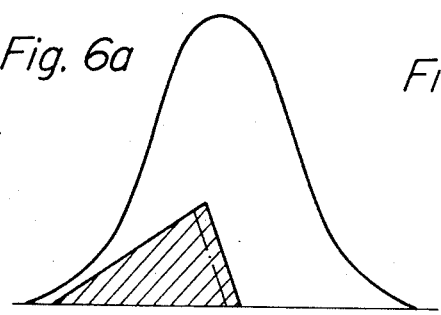 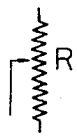 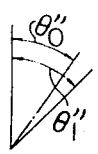 
Fig.6a  Fig.6b  Fig.6c  Fig.6d
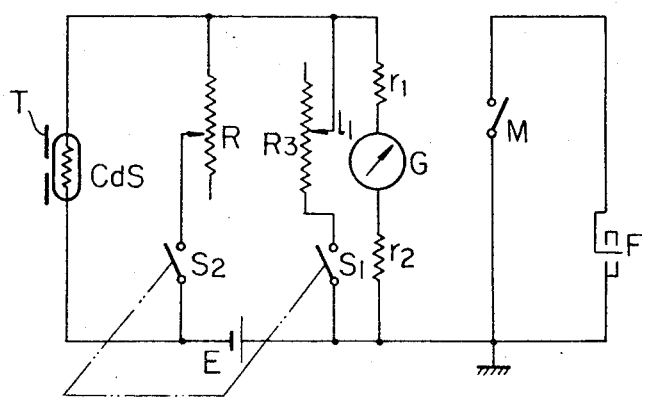
Fig. 7

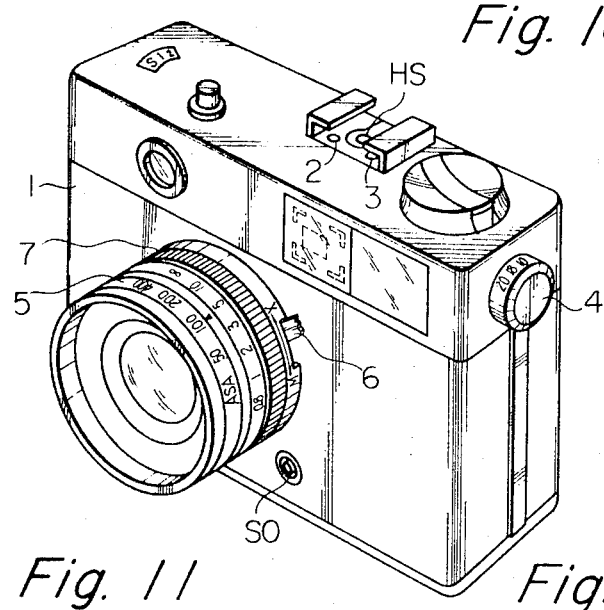
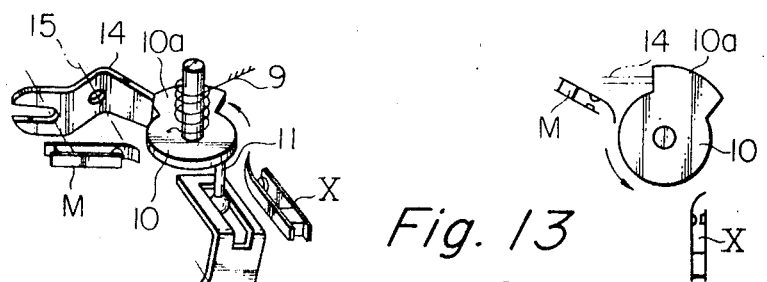
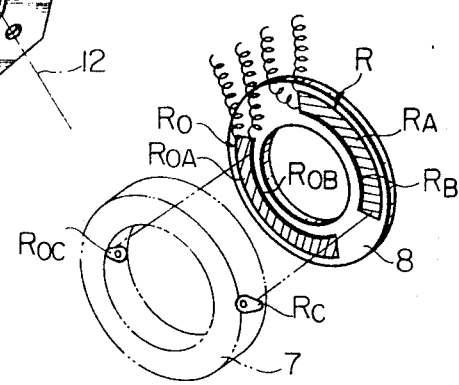

FLASH SYNCHRONIZING DEVICE

Cross-Reference to Related Application

U.S. Ser. No. 90,289 entitled "PROGRAMMING SHUTTER FOR A PHOTOGRAPHIC CAMERA" which was filed on Nov. 17, 1970, now U.S. Pat. No. 3,643,562, discloses the mechanical construction of the programming shutter used in this application.

BACKGROUND OF THE INVENTION

The present invention relates to a flash synchronizing device of a photographic camera having an automatic exposure control device and a programming shutter provided with shutter blades which serve also as diaphragm blades the aperture of which varies so as to attain the proper exposure by means of the automatic exposure control device.

In a photographic camera provided with a programming shutter of the type described above, the amount of movement of the shutter blades is automatically controlled by the automatic exposure control device so that the aperture is varied so as to obtain the proper exposure.

Therefore, it is made difficult to synchronize a flash device coupled with the camera over the entire range of the shutter time. Thus, the flash photography using the synchronizing M-contacts of the camera having a programming shutter has been carried out by setting the shutter time at a low speed and by utilizing a diaphragm additionally mounted on the shutter, thereby unavoidably losing the advantages of the programming shutter.

Since shutter blades of a programming shutter are opened at a relatively low speed and closed rapidly at the moment an aperture for the proper exposure is attained, the X-contact synchronization of a flash device by using X-contacts can be effected if the X-contacts are closed at a moment when the movement of the shutter blades for opening the same is switched to that for closing the shutter blades or at a moment very close thereto. This can be easily carried out by utilizing, for example, a shutter blade actuating member such as a rotary disc operably coupled with the shutter blades which is energized by the film winding operation and rotated one revolution by the releasing of the shutter so as to open the shutter blades during the preceding half revolution of the disc and close the same during the succeeding half revolution of the disc and by locating the X-contacts at a position near the disc at which the X-contacts are closed by a projection formed in the disc when the disc rotates the preceding half revolution.

Thus, the X-contacts are closed at the moment when the shutter blades have been opened for the proper exposure by the automatic exposure control device and the movement of the shutter blades is switched for the closing movement thereof.

In order to properly operate the automatic exposure control device in a flash photography by using a flash device coupled with the camera, a variable resistor may be used in place of a photoelectric element provided in the automatic exposure control device for controlling the movement of the pointer of a galvanometer or the reference time obtained from the time constant setting CR circuit in the automatic exposure control device which variable resistor is coupled with a distance setting ring of the camera so that the resistance of the variable resistor is varied correspondingly to the distance set in the distance setting ring thereby permitting the movement of the pointer or the reference time to be controlled by the resistor.

However, when M-contacts of the camera are used for the synchronization of a flash bulb coupled with the camera which requires a relatively long time such as 15 to 20 milliseconds (ms) until the peak or the maximum intensity of the radiation of the flash bulb is attained from the time of ignition of the bulb and in which the duration of the radiation is relatively long, the M-contacts must be closed at a time about 15 to 20 ms before the shutter blades are opened to attain an aperture for the proper exposure so that the peak of radiation of the flash bulb synchronizes with the full aperture of the shutter blades obtained by the automatic exposure control device for the proper exposure.

Since the time required for opening the shutter blades of a programming shutter to attain an aperture for the proper exposure varies depending upon the conditions of exposure, the time at which the M-contacts are to be closed for synchronizing the peak of radiation of a flash bulb with the full aperture of the shutter blades for the exposure must be varied depending upon the condition of the exposure.

It is very difficult and troublesome to incorporate in a programming shutter such a means for determining the time the M-contacts are to be closed for synchronizing the peak of radiation of a flash bulb with the full aperture of the shutter blades for the proper exposure.

The present invention aims at solving the above described difficulties in the prior art flash synchronizing device.

SUMMARY OF THE INVENTION

The object of the present invention is the provision of a novel and useful flash synchronizing device of a photographic camera having an automatic exposure control device and a programming shutter which avoids the disadvantages of the prior art flash synchronizing device.

The above object is achieved in accordance with the present invention by the provision of a flash synchronizing device comprising M-contacts adapted to be closed at a fixed time at which the shutter blades of the programming shutter commence to open or at a time close thereto and a variable resistor incorporated in the automatic exposure control device so as to control the movement of the pointer of a galvanometer or the reference time obtained by the RC circuit in the automatic exposure control device and coupled with a distance setting ring of the camera so that the resistance thereof is varied in accordance with the setting of the distance in the distance setting ring thereby permitting the full aperture of the shutter blades obtainable by the automatic exposure control device to be varied in accordance with the distance set in the distance setting ring, the resistance characteristics of the variable resistor being so determined that the movement of the pointer of the galvanometer or the reference time obtained by the RC circuit are controlled in the sense that the full aperture of the shutter blades obtainable by the automatic exposure control device is increased as the distance set in the distance setting ring is increased beyond aperture to be given normally by the automatic exposure control device if the peak of radiation is synchronized with the full aperture of the shutter blades, thereby permitting the reduction in the quantity of light received through the shutter resulting from the fact that the peak of radiation of the flash bulb is not synchronized with the full aperture of the shutter blades to be compensated for to obtain the proper exposure.

BRIEF DESCRIPTION OF THE DRAWINGS

FIG. 5(a) to 5(d) are diagrams similar to FIGS. 4(a) to 4(b), respectively, but showing the positions under another condition of the adjustment of the flash synchronizing device;

FIG. 6(a) to 6(d) are diagrams similar to FIGS. 4(a) to 4(d), respectively, but showing the positions under a still other condition of the adjustment of the flash synchronizing device;

FIG. 7 is a wiring diagram showing the electric circuit of an embodiment of the flash synchronizing device of the present invention;

FIG. 10 is a perspective view showing the camera incorporating the flash synchronizing device of FIG. 9;

FIG. 11 is a fragmentally perspective view showing an embodiment of the shutter blade actuating mechanism in the programming shutter of the present invention;

FIG. 12 is a fragmentary plan view showing the arrangement of X-contacts and M-contacts relative to the rotary disc of the shutter blade actuating mechanism of FIG. 11;

FIG. 13 is a schematic perspective view of the arrangement of an embodiment of the variable resistors shown in FIG. 9 with respect to the distance setting ring;

DETAILED DESCRIPTION OF THE PREFERRED EMBODIMENTS

Figure 1:
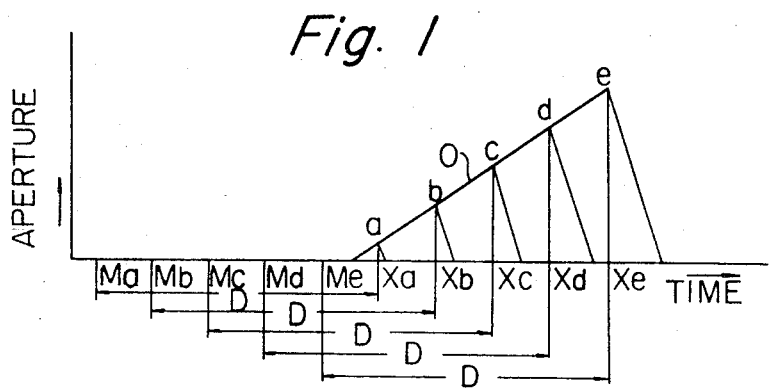
FIG. 1 is a diagram showing the relationship between the time and the aperture of the shutter blades of a programming shutter.

Referring to FIG. 1 showing the variation in the aperture of the shutter blades of a programming shutter in the ordinate, while the abscissa shows the lapse of time, the aperture increases along a straight line o at a relatively low speed and, when the aperture reaches a value for the proper exposure as determined by the automatic exposure control device as indicated by a, b, c, - - -, respectively, for example, the shutter blades are rapidly closed as indicated by lines aXa, bXb, cXc, respectively.

Therefore, when WHEN X-contact synchronization of the flash device is desired, it suffices to close the X-contacts at the point a, b, c, - - - or at a point very close thereto, i.e., at the moment the shutter blades begin to be closed or closely before or after that moment, because the intensity of the flash light reaches instantaneously the maximum intensity or the peak. This can be effected by using a rotary disc in the shutter blade actuating mechanism as described previously.

Figure 2:
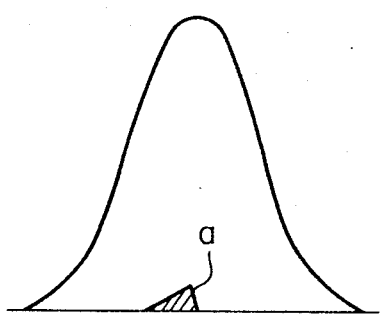
FIG. 2 is a diagram showing the synchronization of the peak of radiation of a flash bulb with the full aperture of the shutter blades of a programming shutter under a first condition of scene brightness.
Figure 3:
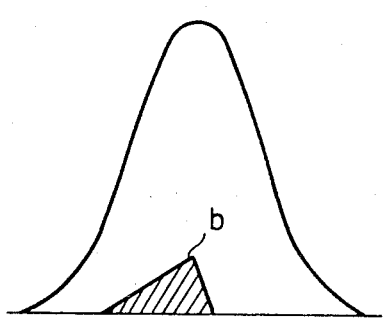
FIG. 3 is a diagram similar to FIG. 2 but showing the synchronization under another condition of the scene brightness.

However, when M-contact synchronization of a flash bulb having a relatively long time D such as 15 – 20 ms, for example, until the intensity of the light reaches the peak from the time of ignition of the flash bulb is desired, the time of ignition of the flash bulb must be changed depending upon the aperture a, b, c - - -. That is, when the M-contact synchronization is to be effected under the condition of the aperture a, the time for igniting the flash bulb must be at the time Ma which precedes the time Xa by the time D. Similarly, the time for ignition must be set at the time Mb which precedes the time Xb by the time D, when the synchronization is to be effected by the aperture b, and so on. FIGS. 2 and 3 show the condition of the synchronization described above in which the peak of radiation of the bulb coincides with the full aperture of the shutter blades, respectively. This is, however, very troublesome in practice and requires a very complicated mechanism in the shutter.

In accordance with the present invention, the time of ignition of the flash bulb in the M-contact flash synchronization is fixedly set at the moment the shutter blades begin to be opened or very close thereto and the full aperture of the shutter blades obtained by the automatic exposure control device is increased by using a variable resistor connected in the automatic exposure control device and coupled with a distance setting ring of the camera in comparison with the aperture normally obtainable by the automatic exposure control device for the proper exposure.

The variable resistor provided in the automatic exposure control device is coupled with the distance setting ring so as to vary the resistance thereof in accordance with the distance set in the distance setting ring so that the indication of the galvanometer in the automatic exposure control device or the reference time obtained by the CR circuit or time constant setting circuit in the automatic exposure control device is varied depending upon the distance set in the distance setting ring. The resistance characteristics of the variable resistor is so determined that the full aperture of the shutter blades obtained by the automatic exposure control device is excessively increased by the provision of the variable resistor in comparison with the aperture normally obtainable when the synchronization of the peak of the bulb with the full aperture is attained.

FIGS. 4(a) to 4(d), 5(a) to 5(d) and 6(a) to 6(d) show the manner how the proper exposure is obtained by the present invention under various apertures of the shutter blades.

Figure 4A:
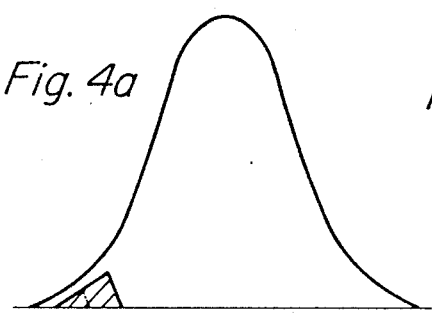
FIG. 4(a) is a diagram showing the relationship between the radiation of a flash bulb and the aperture of the shutter blades of the present invention with respect to the lapse of time, the chain line showing the aperture of the shutter blades of the prior art while the full line shows the aperture obtained by the present invention.
Figure 4B:
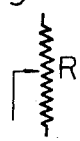
FIG. 4(b) is a diagram showing the variable resistor of the present invention set at the point corresponding to the adjustment of the distance setting ring at a distance.
Figures 4C, 4D:
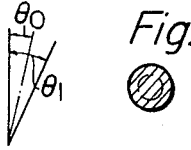
FIG. 4(c) is a diagram showing the amount of movement of the pointer of the galvanometer in the automatic exposure control device defining the full aperture of the shutter blades, $\theta_1$ being the angle obtained by the present invention while $\theta_o$ is the angle normally obtained by the prior art automatic exposure control device.
FIG. 4(d) is a diagram showing the aperture of the programming shutter, the full line showing the aperture obtained by the present invention while the chain line shows the aperture obtained by the prior art programming shutter.

In FIG. 4(a), the aperture indicated by the hatched area is increased beyond the area shown by the chain line. FIG. 4(b) shows the adjustment of the variable resistor coupled with the distance setting ring. FIG. 4(c) shows the angle $\theta_1$ of movement of the pointer of the galvanometer in the automatic exposure control device which is made greater by virtue of the resistance characteristics of the variable resistor than the angle $\theta_o$ which is normally obtained in the M-contact synchronization of the flash bulb. FIG. 4(d) shows the aperture indicated by the hatched area which is obtained by the present invention. This aperture is made greater than the aperture shown by the chain line which is obtainable by the normal M-contact synchronization of the flash bulb. FIGS. 5(a) to 5(d) and 6(a) to 6(d) show the above facts in various full apertures.

FIG. 7 shows an embodiment of the electric circuit of the flash synchronizing device of the present invention. It comprises an electric source E, a photoelectric element CdS and a galvanometer G connected in series to the electric source E, resistors $r_1$ and $r_2$ representing the internal resistance of the galvanometer G and a protective resistor for the galvanometer G, respectively. A variable diaphragm T is located in front of the photoelectric element CdS so as to adjust the device in accordance with the sensitivity of the film used. The above described circuit forms a conventional automatic exposure control device, and the shutter blades are opened to an aperture determined by the movement of the pointer of the galvanometer G for the proper exposure.

A variable resistor $R_3$ having movable contact $l_1$ is connected in parallel to the galvanometer G through a switch $S_1$ so that the device is adjusted in accordance with the guide number of the flash device coupled with the camera.

Another variable resistor R which has been described previously is connected in parallel to the photoelectric element CdS through a switch $S_2$ which is coupled with the switch $S_1$ so as to be opened and closed therewith. The resistor R is coupled with the distance setting ring (not shown) so as to vary the resistance thereof according to the distance set in the distance setting ring. As previously described, the resistance characteristics of the resistor R is so set that the full aperture of the shutter blades is increased.

The plus terminal of the electric source E is grounded to the body of the camera.

M-contacts M are connected in series to the socket F for receiving the flash device. The M-contacts M are closed by the shutter blade actuating mechanism at the time the shutter blades begin to be opened or at a time very close thereto.

In operation of the device described above in M-contact synchronization of the flash bulb, the switches $S_1$, $S_2$ are first closed and the variable resistor $R_3$ is adjusted for the guide number of the flash bulb mounted on the socket F. Then, the distance setting ring is operated so as to set the distance between the camera and the object.

The current flows from the electric source E through the galvanometer G and the resistor R. Thus, the current is controlled by the resistance chracteristics of the resistor R so that the pointer of the galvanometer G is regulated so as to make the aperture of the shutter blades larger than that normally obtained by the conventional automatic exposure control device.

Therefore, when the shutter is released, the shutter blades begin to be opened to attain an excessively large aperture while the bulb is ignited to attain the peak of radiation thereof after a relatively long time such as 15 – 20 ms so that the proper exposure is obtained by virtue of the excessively large aperture even though the peak of the bulb does not synchronize with the full aperture of the shutter blades.

In daylight exposure, the switches $S_1$, $S_2$ are opened so that the photoelectric element CdS operates in the conventional manner to obtain the proper exposure.

Figure 8:
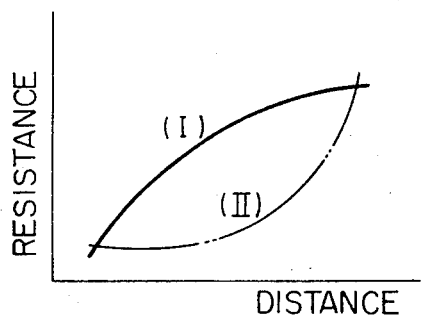
FIG. 8 is a diagram showing various types of the distance characteristics of the variable resistor incorporated in the flash synchronizing device of the present invention to be selected in accordance with the construction of the automatic exposure control device and the programming shutter to be used therewith.

The resistance characteristics of the variable resistor R are selected appropriately as shown by (I), (II) in FIG. 8 depending upon the construction of the automatic exposure control device and the shutter blade actuating mechanism of the shutter.

In the above description, the M-contacts M are described as being closed at a fixed time. However, the M-contacts M may be closed by the operation of a link mechanism coupled with the shutter blade actuating mechanism, in which case the time of closure of the M-contacts is shifted a little amount from the above fixed time.

Figure 9:
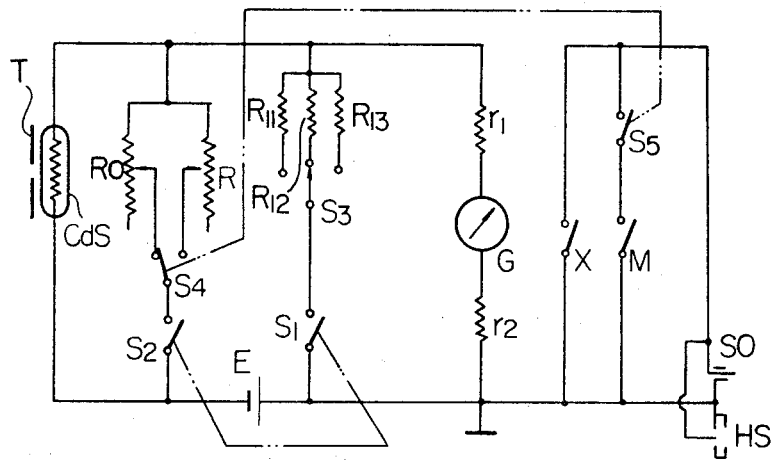
FIG. 9 is a wiring diagram showing the electric circuit of another embodiment of the flash synchronizing device of the present invention.

FIG. 9 shows the electric circuit of another embodiment of the flash synchronizing device of the present invention. The electric circuit of FIG. 9 is substantially similar to that shown in FIG. 7 except that X-contact synchronizing mechanism and a special accessory shoe for automatically closing the switches $S_1$, $S_2$ upon attachment of an electronic flash device thereto are incorporated therein.

As shown in FIG. 9, a variable resistor $R_o$ is connected in parallel to the variable resistor R with one end of each of the resistors $R_o$, R being connected to the switch $S_2$ through a selector switch $S_4$, and a switch $S_5$ is connected to the M-contacts M while X-contacts X are connected in parallel to the M-contacts M through the switch $S_5$. The switch $S_5$ is coupled with the selector switch $S_4$ so that, when the latter is switched to connect the variable resistor R in the circuit, the switch $S_5$ is closed, while the same is opened when the selector switch $S_4$ is switched to connect the variable resistor $R_o$ in the circuit. The variable resistor $R_o$ is coupled with the distance setting ring so that the resistance of the resistor $R_o$ is varied correspondingly to the distance set in the distance setting ring thereby permitting the aperture of the shutter blades to be controlled to obtain the proper exposure in accordance with the distance set in the distance setting ring when the switch $S_4$ is switched to connect the resistor $R_o$ in the circuit and the X-contacts are closed at the moment the shutter blades are opened to attain the aperture controlled by the device of FIG. 9.

In this embodiment a plurality of resistors $R_{11}$, $R_{12}$ and $R_{13}$ each having different resistance and connected in parallel to each other are connected in parallel to the galvanometer G through the switch $S_1$ and a rotary selector switch $S_3$ in place of the variable resistor $R_3$ in FIG. 7 so as to adjust the electric circuit for the guide number of the flash device coupled with the camera.

Figure 15:
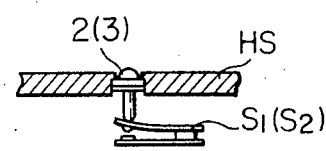
FIG. 15 is a fragmentary sectional view showing the normally opened switches provided in the accessory shoe mounted on the camera of FIG. 10 for attaching the flash device.

A synchronizing socket SO and an accessory shoe HS are connected in parallel as shown. The accessory shoe HS is provided with a pair of pusher pins 2, 3 (FIG. 10), and the switches $S_1$ and $S_2$ are located beneath the respective pusher pins 2, 3 as shown in FIG. 15 so that, when the flash device is attached to the shoe HS, the switches $S_1$, $S_2$ are automatically closed so as to be ready for the flash photography.

FIG. 10 shows a camera incorporating the device of FIG. 9. Knob 4 is coupled with the rotary selector switch $S_3$ so that the adjustment for the guide number is effected by operating the knob 4. A movable lug 6 is provided in the lens barrel of the objective lens and is coupled with the selector switch $S_4$ so that either one of the resistors $R_o$, R is connected in the circuit by operating the lug 6 for the X-contact or the M-contact synchronization. When the resistor R is connected in the circuit, the switch $S_5$ is also closed for connecting the M-contacts M in the circuit. A rotatable ring 5 in the lens barrel is coupled with the diaphragm T so as to control the light received by the photoelectric element CdS so that it is adjusted for the sensitivity of the film used.

The distance setting ring is shown by the numeral 7 and contacts $R_oC$ and $R_c$ are secured to the ring 7 as shown in FIG. 13. The resistors $R_o$ and R are formed by arcuate segments $R_oA$ and RA made of electrically resistive material and secured to a stationary ring 8 in positions corresponding to the contacts $R_oC$ and RC, respectively. Arcuate electrically conductive segments $R_oB$ and RB are secured to the stationary ring 8 along the resistance segments $R_oA$ and RA, respectively, and the contacts $R_oC$ and $R_c$ are adapted to slidably contact the segments $R_oA$, $R_oB$ and RA, RB, respectively, so that the resistances given by the resistors $R_o$ and R can be varied as the distance setting ring 7 is rotated.

The X-contacts X and the M-contacts M are closed by the shutter blade actuating mechanism of the aforementioned earlier application as shown in FIGS. 11 and 12. The shutter blade actuating mechanism comprises a rotary disc 10 having a projection 10a at its periphery which is energized to rotate in the anticlockwise direction by a spring 9 when the shutter is charged. The disc 10 is releaseably held in its energized position by arresting lever 14 rotatable about axis 15 which is disengaged from the projection 10a of the disc 10 when shutter release means (not shown) is actuated. The disc 10 is provided with an actuating rod 11 secured thereto which slidably engages with a slot formed at the bent end of a swingable lever 13 rotatable about axis 12. A pin is secured at the other end of the lever 13 which is coupled with shutter blade actuating member (not shown). Thus, when the disc 10 is rotated by one revolution by the releasing action of the shutter, the lever 12 is swung in the clockwise direction during the first half revolution of the disc 10 and swung back to its initial position during the succeeding half revolution of the disc 10 so that the shutter blades (not shown) are opened during the first half revolution of the disc 10 while they are closed during the succeeding half revolution of the disc 10.

As shown in FIGS. 11 and 12, the M-contacts M are located adjcent to the projection 10a of the disc 10 in advance in the direction of rotation of the disc 10 so as to be closed by the projection 10a at about the beginning of rotation of the disc 10 while the X-contacts X are located at a position at which the X-contacts X are closed by the projection 10a when the disc 10 rotates about a half revolution from the initial position thereof. That is, M-contacts M are closed at about the beginning of the opening movement of the shutter blades while the X-contacts X are closed at about the moment the opening movement of the shutter blades is terminated and the closing movement of the same begins.

In operation for the M-contact synchronization of a flash bulb, the lug 6 of the camera is moved to switch the switch $S_4$ to connect the resistor R in the circuit while the switch $S_5$ is closed, and the ring 5 is operated to adjust for the sensitivity of the film in the camera. Then, a flash device having a flash bulb is attached to the shoe HS, so that the switches $S_1$ and $S_2$ are automatically closed for the flash synchronization. The knob 4 is operated to adjust for the guide number of the flash bulb.

After the shutter is charged and the distance setting ring 7 is adjusted, the shutter is released so that the M-contact flash synchronization is effected for the proper exposure.

When X-contact synchronization is desired the switch 4 is switched to connect the resistor $R_o$ for the X-contact synchronization by the operation of the lug 6 and the flash device is replaced by an X-contact flash device. The operation is similar to that of M-contact synchronization.

Figure 14:
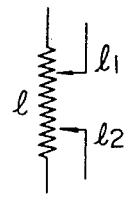
FIG. 14 is a diagram showing an alternative form of the variable resistor used in the electric circuit of the flash synchronizing device of FIG. 9 for adjusting the guide number of the flash device coupled with the camera.

The resistors $R_{11}$ to $R_{13}$ may be replaced by a resistor $l$ having movable contacts $l_1$ and $l_2$ as shown in FIG. 14 so that the sensitivity of the film can also be set in the camera.

Figure 16:
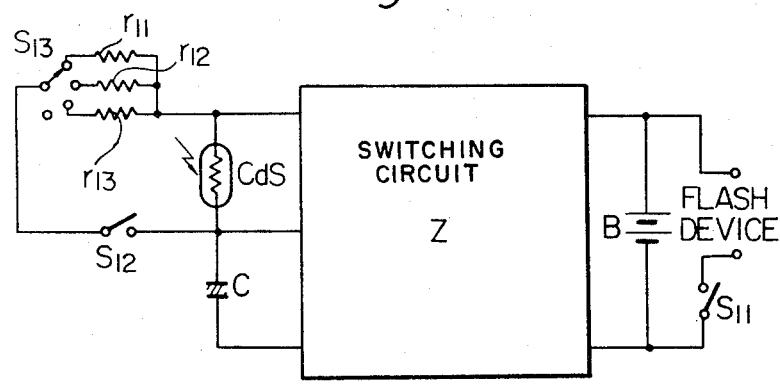
FIG. 16 is a wiring diagram of the electric circuit of an alternative form of the flash synchronizing device of the present invention.

FIG. 16 shows a still further embodiment of the flash synchronizing device of the present invention.

In this embodiment, the electric circuit of the automatic exposure control device includes a time constant setting RC circuit in place of the galvanometer G of FIGS. 7 and 9 for determining the reference time for controlling the shutter blades for the proper exposure.

The resistance of a photoelectric element such as a CdS element varies correspondingly to the intensity of light received thereby when the intensity of the light varies gradually. However, if the photoelectric element is illuminated by a light such as that emanating from a flash lamp the intensity of which varies suddenly, the resistance of the photoelectric element can not vary instantaneously in response to the variation in the intensity of the light received by the photoelectric element thereby resulting in a certain time lag to attain the resistance corresponding to the intensity of light received.

Therefore, the aperture of the programming shutter controlled by the automatic exposure control device tends to be made excessively large when a flash device is used, thereby resulting in an overexposure. This tendency of the overexposure is not so serious when the distance between the object and the camera is great. However, if the distance is small, the tendency of the overexposure due to the time lag of the variation in the resistance of the photoelectric element in response to the rapid variation in the intensity of light received thereby becomes serious, and a significant overexposure will be obtained.

The embodiment of FIG. 16 avoids the above described overexposure by the provision of a variable resistor connected in parallel to the photoelectric element of the automatic exposure control device, which variable resistor is coupled with the distance setting ring of the camera so that the resistance thereof is varied correspondingly to the distance set in the distance setting ring thereby permitting the overexposue in the flash photography to be avoided by virtue of the resultant resistance of the photoelectric element and the variable resistor.

In FIG. 16, a photoelectric element CdS and a capacitor C are connected in series so as to form a timing circuit or a time constant setting CR circuit. The ends of the capacitor C are connected to the input of a switching circuit Z of the programming shutter. The switching circuit is conventional, and an electric source B connected to the switching circuit Z supplies the power thereof to the timing circuit and the switching circuit Z. The terminals of the electric source B are also connected to a flash device through a switch $S_{11}$.

In accordance with the feature of the present invention, a plurality of resistors $r_{11}$, $r_{12}$ and $r_{13}$ each having a different resistance are connected at their one ends to one end of the photoelectric element CdS while the other ends are connected to the other end of the photoelectric element CdS through a rotary switch $S_{13}$ and a normally opened switch $S_{12}$ so that either one or none of the resistors $r_1$, $r_2$, $r_3$ can be selectively connected in parallel to the photoelectric element CdS by closing the switch $S_{12}$ and operating the switch $S_{13}$. As in the case of the embodiment of FIG. 9, the switches $S_{11}$ and $S_{12}$ may be automatically closed by attaching the flash device to the accessory shoe of the camera.

The switch $S_{13}$ is coupled with the distance setting ring of the camera so that the selected one or none of the resistors $r_{11}$, $r_{12}$, $r_{13}$ is connected to the photoelectric element CdS depending upon the distance set in the distance setting ring. The resistance of each of the resistors $r_{11}$, $r_{12}$ and $r_{13}$ is so determined that the resistance of the resistor connected to the photoelectric element CdS is made smaller correspondingly to the distance as the distance set in the distance setting ring is made shorter. When the distance set in the distance setting ring is made substantially great, any of the resistors $r_{11}$, $r_{12}$, $r_{13}$ is disconnected from the circuit so as to achieve the normal automatic exposure control.

In operation of the flash photography at a relatively short distance, the current is applied to the capacitor C through the resultant resistance of the photoelectric element CdS and the resistor connected in parallel thereto which is smaller than the resistance of the photoelectric element CdS per se so that the reference time or the time constant set by the timing circuit consisting of the photoelectric element CdS and the capacitor C is made small in comparison with the time constant normally obtained when the resistor $r_{11}$, $r_{12}$, or $r_{13}$ is not connected, so that the overexposure is positively avoided.

Figure 17:
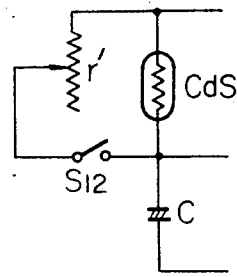
FIG. 17 is a fragmentary wiring diagram showing another form of the flash synchronizing device of FIG. 16.

FIG. 17 shows an alternative form of the variable resistor connected to the photoelectric element CdS. The variable resistor $r'$ is connected in parallel to the photoelectric element CdS through the switch $S_{12}$. The resistor $r'$ is coupled with the distance setting ring so as to vary its resistance in accordance with the distance set in the distance setting ring. The operation of the embodiment of FIG. 17 is similar to that of FIG. 16.

I claim:

1. In a photographic camera having a movable distance setting element, an electrically operated automatic exposure control device, a programming shutter controlled by said device, said shutter having blades adapted to be opened to form an aperture, said aperture being varied by said device for obtaining proper exposure, whereby the shutter blades serve as a diaphragm, and flash synchronizing means, the improvement in the flash synchronizing means which comprises:

a. M-contacts for a flash bulb;
    b. coupling means coupling said M-contacts with said shutter for closing said M-contacts substantially at the same time said shutter blades begin to be opened;
    c. a first variable resistor;
    d. motion transmitting means operatively interposed between said first variable resistor and said distance setting element for varying the resistance of said first variable resistor in response to movement of said distance setting element;
    e. circuit means including first switch means for connecting said first variable resistor with said exposure control device and for thereby increasing said aperture in response to an increase in the distance for which said distance setting element is set;
    f. X-contacts for an electronic flash device;
    g. coupling means coupling said X-contacts with said shutter for closing said X-contacts when said shutter blades begin to be closed after having been opened;
    h. a second variable resistor;

i. motion transmitting means operatively interposed between said second variable resistor and said distance setting element for varying the resistance of said second variable resistor in response to movement of said distance setting element;
j. selector switch means for alternatively connecting said first and second variable resistors to said automatic exposure control device when said first switch means is closed;
k. third switch means in circuit with said M-contacts and movable between a contact-operating and a contact-inactivating position in which said third switch means make said M-contacts operative and inactive respectively; and
l. coupling means coupling said third switch means to said selector switch means for moving said third switch means into the contact-operating position thereof when said selector switch means connects said first variable resistor to said automatic exposure control device, and for moving said third switch means into the contact-inactivating position when said selector switch means connects said second variable resistor to said automatic exposure control device.

2. In a camera as set forth in claim 1, wherein said exposure control device includes a photoelectric element and a galvanometer in circuit with said photoelectric element, said galvanometer having a pointer moving in response to light sensed by said photoelectric element and connected to said shutter for controlling said aperture, said first variable resistor being arranged in parallel circuit with said photoelectric element through said first switch means.

3. In a camera as set forth in claim 1, a further variable resistor, means for varying the resistance of said second variable resistor in accordance with the guide number of a flash device to be coupled with said camera, further switch means for selectively connecting said further variable resistor in circuit with said automatic exposure control device and for thereby adjusting said automatic exposure control device for said guide number, and means coupling said first and further switch means for joint opening and closing.

4. In a camera as set forth in claim 1, a plurality of resistors of different respective resistances, second switch means and selector switch means interposed in series circuit between said resistors and said automatic exposure control device for selectively connecting each of said resistors to said automatic control device, and for thereby adjusting said aperture in response to the setting of said selector switch means, means for setting said selector switch means in accordance with the guide number of a flash device to be coupled to the camera, and coupling means coupling said first and second switch means for joint opening and closing.

* * * * *